July 4, 1961      B. R. JOYCE      2,991,201
DUST-FREE ACTIVATED CARBON ARTICLES
Filed May 4, 1959
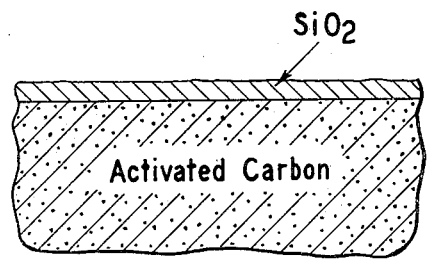
INVENTOR.
BLAINE R. JOYCE
BY *John F. Hohmann*
ATTORNEY

United States Patent Office 2,991,201
Patented July 4, 1961

2,991,201
DUST-FREE ACTIVATED CARBON ARTICLES
Blaine R. Joyce, Fostoria, Ohio, assignor to Union Carbide Corporation, a corporation of New York
Filed May 4, 1959, Ser. No. 810,903
2 Claims. (Cl. 117—169)

This invention relates to a method of preventing loss from activated carbon articles by coating the same with colloidal silica. The invention is concerned more particularly with the prevention of "dusting" or "rub-off" from plastic-bonded activated carbon inserts.

Activated carbon inserts are used extensively in closure caps of receptacles containing food concentrates, vitamins and other organic pharmaceuticals. Such inserts give excellent results in the abatement of odors evolved by the receptacle contents, inasmuch as carbon placed in a receptacle cap has the added advantage of being located at the mouth of the receptacle where vapor diffusion occurs.

A problem encountered with the use of such inserts is the loss by "dusting" of carbon therefrom. This problem is aggravated by the fact that these inserts are normally placed into the caps by machines. As a result of this type of loss, receptacle contents become mixed with activated carbon.

The principal object of this invention accordingly is to prevent the above indicated loss from activated carbon articles without deleteriously affecting the carbon activity.

Another object of the invention is to provide plastic bonded activated carbon articles having a thin coating of colloidal silica.

A further object of the invention is to provide a method for the rapid and uniform coating of activated carbon articles with colloidal silica.

The invention by means of which these objects are attained comprises the formation of a dust-proof envelope or coating of silicon dioxide around the surface of the carbon articles by contacting the same with an aqueous suspension of colloidal silica, and drying the coated articles.

The single figure illustrating the invention is a sectional view showing a coated article.

The composition of the aqueous colloidal suspensions suitable for use in the practice of this invention ranges from 24 percent to 32 percent. For some carbon types, this concentration may be reduced without obtaining a dusty article. In most applications, a solution containing 24 to 26 percent solids produces satisfactory dust-proof coatings.

Any method of applying the coating which allows for uniform thickness is acceptable. Dipping, brushing or spraying are suitable for this purpose. Where the coated articles are not plastic bound, drying temperatures and periods are not critical. In the case of plastic bound activated carbon articles, with which this invention is more specifically concerned, these factors are determined principally by the characteristics of the binders. Obviously the drying temperatures must be kept below the degrading temperatures of the binders. As these binders are normally synthetic organic plastic derivatives such as polyvinyl acetate, polystyrene, styrene-butadiene copolymers or acrylic resins, a general range for the above factors may be set forth. This range comprises a minimum temperature of 100° maintained for about 16 hours, up to a temperature of 125° C. maintained for 12 hours. As the drying temperature is increased, the time of drying correspondingly decreases. The amount of binder ranges from 10 to 20 parts by weight per 100 parts of activated carbon. Molding pressures employed may range from as little as 4.5 to as high as 15 tons per square inch, depending upon the mix mold temperature and density sought. Generally the molding pressure applied in forming the resin-bonded carbon articles is governed by the degree of porosity required in the article.

It has been found that satisfactory prevention of dust loss can be obtained where the activated carbon article has a coating having a thickness of about .001 inch. This can be expressed also as 0.004 g./cm.$^2$ or 0.026 gm./in.$^2$. Some applications may naturally require heavier coatings and these may be applied also by following the method of this invention.

The following is presented as an example of the practice of the invention.

Stick-proof carbon inserts of activated carbon bound by polyvinyl acetate were taken from their molding press as they issued, and placed in small wire baskets. These baskets were dipped into an aqueous suspension of silica having 25 percent solids, and shaken sideways two or three times to cause the solution to pass between the inserts. The basket was removed from the solution, its contents allowed to drain, and air dried for a short period of time of the order of one or two minutes. The inserts were then stacked in trays in layers about 10 deep, and dried overnight at approximately 125° C. The resultant coated articles were dust-free, and their activity in no wise reduced. When viewed under a microscope the coating had the appearance of cracked, dried mud.

The method of the invention is applicable to molded or unmolded carbon articles. It may also be used to coat activated carbon pellets.

The articles of the present invention in the form of coated molded activated carbon capsules and cubes are particularly useful as gas scavengers in enclosed electrical relays. Relay performance is improved when readily ionizable gaseous materials such as volatiles from insulating material, soldering fluxes, etc. are removed from the atmosphere of the relay enclosure.

This application is a continuation-in-part of my previous application, Serial No. 601,483, filed August 1, 1956, now abandoned.

What is claimed is:

1. A shaped absorbent article intended for use in closure caps of receptacles to abate odors evolved by the receptacle contents and as a gas scavenger to remove readily ionizable gaseous materials from electrical relays, and consisting essentially of activated carbon particles bound by means of a synthetic organic binder selected from the group consisting of polyvinyl acetate, polystyrene, styrene-butadiene and acrylic resins, said shaped article being coated with a thin envelope to substantially eliminate its tendency to rub off carbon particles therefrom without adversely affecting the activity of said carbon, said envelope consisting of silica and being of a thickness of about 0.001 inch representing a weight of about 0.026 gram of silica per square inch of said article.

2. A shaped article consisting of activated carbon and intended for use in closure caps of receptacles to abate odors evolved by the receptacle contents and as a gas scavenger to remove readily ionizable gaseous materials from electrical relays, said article having a coating consisting of a thin envelope of silica of a thickness of about 0.001 inch, representing a weight of about 0.026 gram of silica per square inch of said article, said coating substantially eliminating the tendency of the article to rub off carbon particles therefrom without adversely affecting the activity of the carbon.

(References on following page)

References Cited in the file of this patent

UNITED STATES PATENTS

| | | |
|---|---|---|
| 1,868,565 | Connolly | July 26, 1932 |
| 1,991,487 | Bemis | Feb. 19, 1935 |
| 1,999,499 | Burgess | Apr. 30, 1935 |
| 2,118,898 | Price | May 31, 1938 |
| 2,383,653 | Kirk | Aug. 28, 1945 |
| 2,439,538 | Burgess | Apr. 13, 1948 |
| 2,443,512 | Powers et al. | June 15, 1948 |
| 2,470,180 | McHatton | May 17, 1949 |
| 2,649,388 | Wills et al. | Aug. 19, 1953 |
| 2,859,139 | Ramadanoff | Nov. 4, 1958 |

FOREIGN PATENTS

| | | |
|---|---|---|
| 247,241 | Great Britain | Feb. 15, 1926 |